United States Patent
Fan et al.

(10) Patent No.: US 8,948,230 B1
(45) Date of Patent: Feb. 3, 2015

(54) MULTI-RATE COEXISTENCE SCHEME IN DSSS O-QPSK NETWORK

(71) Applicant: Uniband Electronic Corp., Hsin-Chu (TW)

(72) Inventors: Yiping Fan, Hsinchu (TW); Li-Feng Chen, New Taipei (TW); Sheng-Wei Chiang, Hsinchu County (TW); Chun-Chin Chen, Taoyuan County (TW)

(73) Assignee: Uniband Electronic Corp., Hsin-Chu (TW)

( * ) Notice: Subject to any disclaimer, the term of this patent is extended or adjusted under 35 U.S.C. 154(b) by 0 days.

(21) Appl. No.: 14/092,960

(22) Filed: Nov. 28, 2013

(51) Int. Cl.
  *H04B 1/00* (2006.01)
  *H04B 1/707* (2011.01)
  *H04L 27/18* (2006.01)

(52) U.S. Cl.
  CPC ............... *H04B 1/707* (2013.01); *H04L 27/18* (2013.01)

USPC ........... 375/146; 375/259; 375/260; 375/295; 375/316

(58) Field of Classification Search
  USPC ...................... 375/259, 260, 295, 316, 146
  See application file for complete search history.

(56) References Cited

U.S. PATENT DOCUMENTS

2007/0230563 A1* 10/2007 Tian et al. ................. 375/240.01
2011/0029317 A1* 2/2011 Chen et al. .................... 704/500

* cited by examiner

*Primary Examiner* — Siu Lee
(74) *Attorney, Agent, or Firm* — Winston Hsu; Scott Margo

(57) ABSTRACT

An IEEE 802.15.4 DSSS Offset-QPSK device is proposed that allows an existing system to transfer Offset-QPSK modulation signal into MSK modulation signal, then deliver the MSK modulation signal without DSSS to increase payload data transmission rate. On-the-fly detection of whether a low data rate or a high data rate encoding mode is used for a received frame is attained by the transmitter setting a predetermined bit in the frame length byte of a transmitting frame. Thus an extra high data rate transmission for IEEE 802.15.4 DSSS Offset-QPSK systems can be provided.

14 Claims, 8 Drawing Sheets

Overview block diagram of proposed OQPSK/MSK coexistence approach

Related Art and proposed predetermined bit for multi-rate coexistence scheme

2Mbps MSK modulation scheme

Overview block diagram of proposed OQPSK/MSK coexistence approach

State machine for O-QPSK phase rotation

FIG. 5 The block diagram of proposed baseband system

The processing flow of proposed method

MULTI-RATE COEXISTENCE SCHEME IN DSSS O-QPSK NETWORK

BACKGROUND OF THE INVENTION

1. Field of the Invention

This application relates to Institute of Electrical and Electronics Engineers (IEEE) 802.15.4 DSSS Offset-QPSK devices, and more specifically allowing an existing IEEE 802.15.4 DSSS Offset-QPSK system to transfer Offset-QPSK modulation signal into minimum-shift keying (MSK) modulation signal, then deliver the MSK modulation signal without DSSS while increasing the rate of payload data transmission.

2. Description of the Prior Art

The IEEE 802.15.4 specification defines the physical and media access protocols for 2.4 GHz Industrial, Scientific, and Medical (ISM) radio bands for wireless network applications. It provides a direct-sequence spread spectrum (DSSS) Offset-Quadrature Phase-shift keying (Offset-QPSK) modulation network to support 250 Kbps data transmission.

There are two main steps in IEEE 802.15.4 baseband transmission; the first step is DSSS and the second step is Offset-QPSK modulation with half-sine pulse shaping. The DSSS is a 4:32 spreading rate scheme and outputs 32 digits of pseudo spreading code for each 4 digits of input bits. When cooperating with a 250 Kbps input data rate, the DSSS spread input signal to a 2 Mega chips rate signal. The Offset-QPSK modulation used in this system is a variant of QPSK modulation in that the Q-Phase signal half chip period is offset (delayed) from the I-Phase signal, then half-sine pulse shaping is performed on the I-Phase and Q-Phase signals. This offsetting and shaping action can avoid a zero-crossing in constellation mapping of quadrature modulation.

Referring to FIG. 1 upper half region, the frame structure of an IEEE 802.15.4 Offset-QPSK transmitted package consists of a preamble, a delimiter (SFD), frame length bits (PHR), and payload data. The PHR has 8 bits, 7 bits for indicating frame length and the $8^{th}$ bit is not used. Therefore, the maximum payload data length is 127 bytes.

In a typical standard IEEE 802.15.4 network, every station has to transmit at the above mentioned data rate and protocol in order to be certified and communicate with each other. However, there are applications where multi-rate transmission and on fly detection are desired.

Some applications may desire high date rate transmission bandwidth but are limited by system specification even the received signal quality or network link quality is satisfied for transmission without spreading gain. Applying the proposed multi-rate transmission and on-fly detection can provide adoptive transmission rate for more applications.

SUMMARY OF THE INVENTION

To permit multi-rate transmission and on fly detection of transmission rate, an IEEE 802.15.4 DSSS Offset-QPSK device is proposed that comprises a transmitter configured to set a predetermined bit in the PHR of the transmission frame to indicate whether the transmission frame is encoded by a standard encoding mode or by a proprietary encoding mode and a receiver configured to decode a received transmission frame according to whether the predetermined bit in the PHR of the received transmission frame indicates the received transmission frame is encoded by the standard encoding mode or by the proprietary encoding mode.

When utilizing the standard encoding mode, the transmitter is configured to map a preamble, a delimiter (SFD), the frame length byte, and payload data to corresponding spreading codes to form a data stream. When the transmitter modulates the DSSS data stream in O-QPSK modulation, the data stream is separated into an I-Phase stream and a Q-Phase stream, then the Q-Phase is delayed by half-chip. After the Q-Phase is delayed by half-chip, the I-Phase stream and the Q-Phase stream are passed to half-sine shape pulse shaping and then combined to form an O-QPSK quadrature signal.

The transmitter may be further configured to map the data stream from Offset-QPSK modulation to MSK modulation to form the transmission frame and modulate the transmission frame according to MSK quadrature modulation, or according to MSK direct VCO modulation (either open or closed VCO modulation).

When utilizing the proprietary encoding mode, the transmitter is configured to map a preamble, a delimiter (SFD), and the frame length byte, to corresponding spreading codes to form a data stream. Payload data is appended to the data stream to form an appended data stream without mapping the payload data to the corresponding spreading codes. The transmitter then may modulate the transmission frame according to MSK quadrature modulation, or according to MSK direct VCO modulation.

A method of operating an IEEE 802.15.4 DSSS Offset-QPSK device comprises setting a predetermined bit in a frame length byte of a transmission frame to indicate whether the transmission frame is encoded by a standard encoding mode or by a proprietary encoding mode different from the standard encoding mode, and decoding a received transmission frame according to whether the predetermined bit in the received transmission frame indicates the received transmission frame is encoded by the standard encoding mode or by the proprietary encoding mode.

When the transmission frame is encoded by the standard encoding mode, the method further comprises mapping an Offset-QPSK preamble, a delimiter (SFD), the frame length byte, and a payload data to corresponding spreading codes to form a data stream, mapping the data stream from Offset-QPSK modulation to MSK modulation to form the transmission frame, and transmitting the transmission frame.

Where the transmission frame is encoded by the standard encoding mode, the method further comprises mapping an Offset-QPSK preamble, a delimiter (SFD), and the frame length byte to corresponding spreading codes to form a data stream, appending payload data to the data stream to form the transmission frame without mapping the payload data to the corresponding spreading codes, and modulating the transmission frame according to MSK modulation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
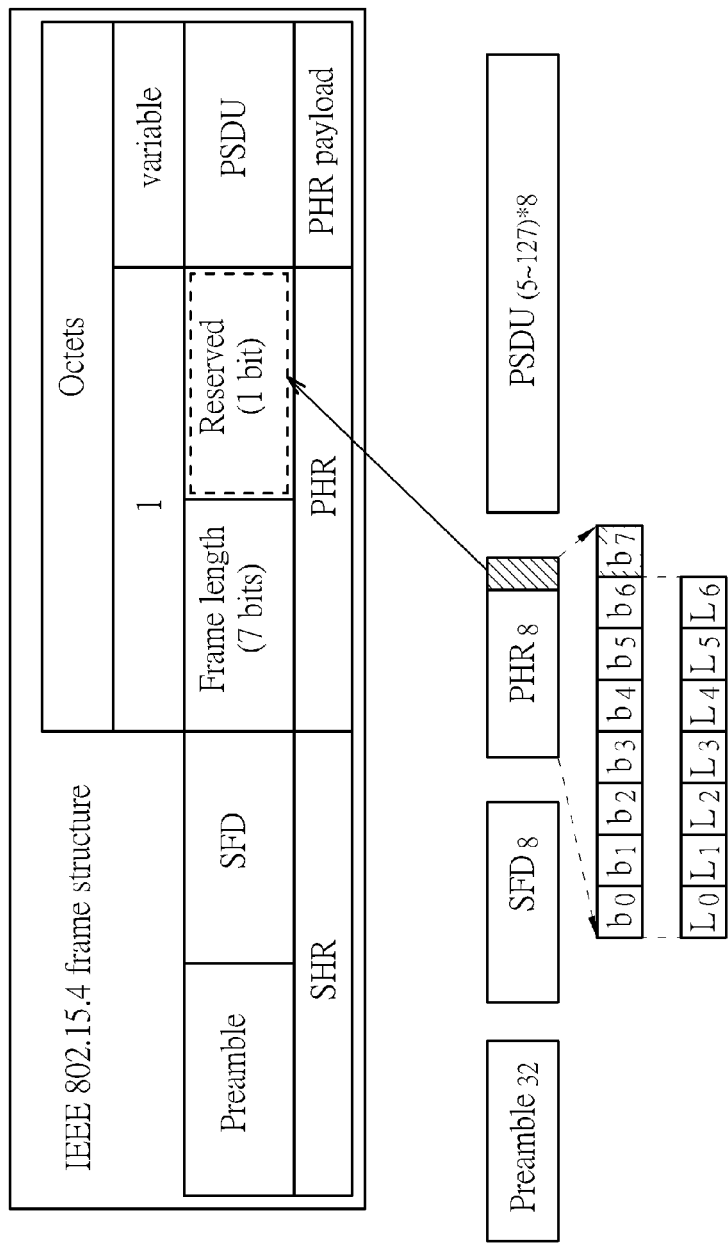
FIG. 1 illustrates the frame structure for a DSSS Offset-QPSK modulation network and proposed predetermined bit for multi-rate coexistence scheme.

One example application where multi-rate transmission and on fly detection is desired is to use the 250 kbps standard mode to transmit the more important control information and to apply a higher rate to transmit other types of information, such as audio and video data, in a proprietary mode. Another example application where multi-rate transmission and on fly detection is desired is to use the low data rate to achieve a longer transmission distance while maintaining a higher data rate for a shorter transmission distance.

Another example application where multi-rate transmission and on fly detection is desired is to use the low data rate when interference in the channel exceeds a threshold while maintaining a higher data rate when interference in the channel does not exceed a threshold. It is noted that example applications recited in this document do not limit claims to exclude other potential applications of multi-rate transmission as disclosed herein.

The innovation in a way to achieve the coexistence of the standard mode or proprietary mode with the IEEE 802.15.4 physical layer is disclosed. A deep study of Offset-QPSK signaling with half sine pulse shaping reveals that this particular modulation scheme can be mapped into minimum phase shift keying (MSK).

In the Offset-QPSK with half-sine pulse shaping signal, the rotating direction is decided by previous I-phase information and current Q-phase information, or vice versa. The combination of input and result is shown below in table 1. Herein, the term "CW" means "clockwise rotation" and the term "CCW" means "counter-clockwise rotation". In MSK, a digital 1 moves the phase by +90 degree while a digital 0 moves the phase by −90 degrees, or vice versa. Therefore, both Offset-QPSK with half-sine pulse shaping and MSK change the phase by 90 degrees. The difference is that in MSK, the phase change only depends on the current bit; in Offset-QPSK, the phase change depends on both the current bit and the previous bit.

TABLE 1 the phase rotation of O-QPSK, MSK modulation

| O-QPSK I-Phase stream rotation | | | |
|---|---|---|---|
| Q: +1 --> I: +1 | Q: +1 --> I: −1 | Q: −1 --> I: +1 | Q: −1 --> I: −1 |
| CW π/2 | CCW π/2 | CCW π/2 | CW π/2 |
| O-QPSK I-Phase stream rotation | | | |
| I: +1 → Q: +1 | I: +1 → Q: −1 | I: −1 → Q: +1 | I: −1 → Q: −1 |
| CCW π/2 | CW π/2 | CW π/2 | CCW π/2 |
| MSK modulation | | | |
| input bit | mapped symbol | output rotation | mapped frequency |
| 1 | +1 | CCW π/2 | $+f_{dev}$ |
| 0 | −1 | CW π/2 | $-f_{dev}$ |

Observing the current chip and previous chip from Offset-QPSK input in table 1, we can find the relationship between input and output. When current chip is an I-Phase chip, if the previous Q-Phase chip and current I-Phase chip are the same sign value, output will be phase rotated clockwise by 90 degrees; if the previous Q-Phase chip and current I-Phase chip are not the same sign value, output will be phase rotated counter-clockwise by 90 degrees. In the other possibilities, when a current chip is a Q-Phase chip, if the previous I-Phase chip and current Q-Phase chip are the same sign value, output will be phase rotated counter-clockwise by 90 degrees; if the previous I-Phase chip and current Q-Phase chip are not the same sign value, output will be phase rotated clockwise by 90 degrees. This allows a reduction of table 1 to table 1-1 shown below.

TABLE 1-1 the reduced Offset-QPSK input chip & its rotation information

| previous: Q-Phase bit, current: I-Phase bit | |
|---|---|
| $d_Q * d_I = +1$: CW π/2 | $d_Q * d_I = -1$: CCW π/2 |
| previous: I-Phase bit, current: Q-Phase bit | |
| $d_I * d_Q = +1$: CCW π/2 | $d_I * d_Q = -1$: CW π/2 |

Figure 4:
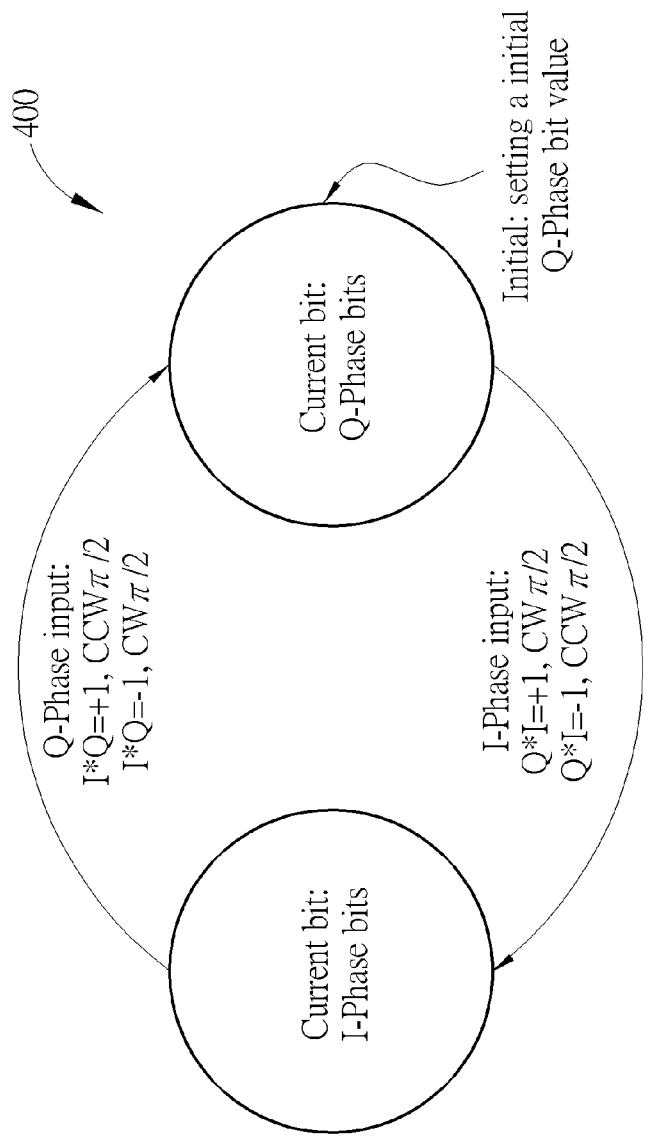
FIG. 4 illustrates a finite state machine where the input is the Offset-QPSK input stream, separated into the I-phase bits and the Q-Phase bits, and the transition output is the phase rotation information.

Table 1-1 contents can be represented as a finite state machine 400 shown in FIG. 4. In this state machine 400, there are four states and symmetric transition topology. The input is the Offset-QPSK input stream, separating into an I-stream and a Q-stream, and the transition output is the phase rotation information.

When Offset-QPSK chip rate equals the MSK symbol rate, the rotation phase for each chip duty (in Offset-QPSK) and each symbol duty (in MSK) are the same value. Coordinating the application chip rate or symbol rate, this rotation frequency value is equal to a quarter of chip rate (in Offset-QPSK) or a quarter of symbol rate (in MSK). Besides the MSK modulation method can be implemented via a direct VCO modulation scheme. Using the transfer table shown in table 1-1, we can get MSK data bits representing the Offset-QPSK data bits, then modulate MSK signal by direct VCO modulation.

Herein, a coexistence approach is proposed to implement Offset-QPSK modulation and MSK modulation by conventional approach or direct VCO modulation. An overview block diagram of the proposed coexistence approach is shown in FIG. 3.

Figure 3:
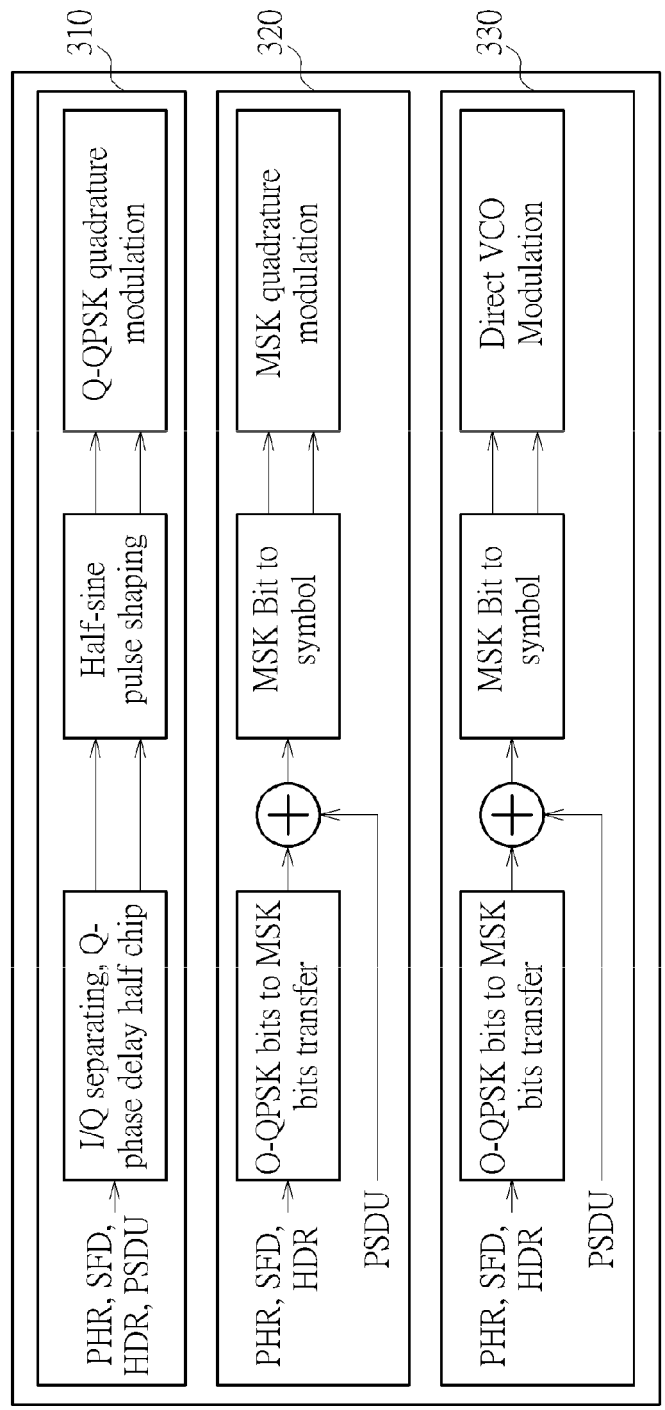
FIG. 3 is an overview block diagram of the proposed approach for coexistence of the standard encoding mode and the proprietary encoding mode using MSK quadrature modulation or MSK direct VCO modulation.

In FIG. 3, the upper row indicated as row 310 is conventional Offset-QPSK modulation flow. The PHR, SFD, HDR, PSDU data bits pass through serial to parallel (I-phase stream and Q-phase stream), then the Q-phase stream is delayed by a half chip period. Based on the I-phase/Q-phase data value, half-sine pulse shaping is applying to the I-phase and the Q-phase simultaneously. The last process is quadrature modulation via the I-phase and the Q-phase shaping result.

The other two rows in the block diagrams in FIG. 3, indicated as rows 320 and 330, are embodiments of the proposed design. The second row 320 in FIG. 3 is an embodiment including Offset-QPSK modulation using MSK quadrature modulation and the third row 330 is an embodiment using MSK direct VCO modulation. Before MSK implementation (MSK quadrature modulation scheme or MSK direct VCO modulation scheme), the Offset-QPSK information bits are transferred into MSK information bits using the mapping table shown in table 1-1 and the state machine 400 shown in FIG. 4. This transfer calculates the Offset-QPSK previous bit and current bit information to get the mapped MSK bit. The MSK bit to symbol is found via a direct mapping table (as shown in table 1 bottom, the 1st and 2nd columns). This transfer also converts the bit information into rotating phase value and direction (as shown in table 1 bottom, the 3rd column). After the transfer, there is a branch to different modulation methods. One available modulation method is the conventional quadrature modulation approach, another available method is a direct VCO modulation approach. The quadrature modulation approach is describing the rotating phase by complex signal form symbol by symbol. In the direct VCO modulation approach, the phase rotation can be represented as frequency information (as shown in table 1 bottom, the 4th column), so the direct VCO modulation can handle MSK symbols easily.

One possible implementation of two coexistent modes on the fly uses the unused, reserved $8^{th}$ bit in PHR field of the IEEE 802.15.04 frame structure. The unused, reserved bit can be used to identify which modulation is used in following payload data. By detecting whether the $8^{th}$ digit of the frame length bits is a 0 or a 1 on the fly, the receiver distinguishes between the standard mode and proprietary mode and can determine which of 8 spreading codes associated with the detected mode is being used without first predefining which mode is used.

To create the proprietary 2 Mbps mode, one embodiment does not spread the payload data bits after the frame length field. This means, spreading codes are used for the preamble, the SFD, and the PHR but no spreading codes are used for the payload data. Because the DSSS is a 4:32 spreading rate scheme and outputs 32 digits pseudo spreading code for each 4 digits of input bits, the transmission rate of the un-spread payload data bits is 8 times that of a spreading preamble, SFD and PHR. Thus the data rate of payload bits is changed from the standard mode rate of 256 Kbps to the proprietary mode rate of 2 Mbps.

The $8^{th}$ bit of PHR in FIG. 1 is illustrated as indicating DSSS Offset-QPSK mode at 256 Kbps when the $8^{th}$ bit is a 0, and MSK mode at 2 Mbps when the $8^{th}$ bit is a 1, however it is also possible for this to be reversed, and the $8^{th}$ bit to indicate DSSS Offset-QPSK mode at 256 Kbps when the $8^{th}$ bit is a 1, and MSK mode at 2 Mbps when the $8^{th}$ bit is a 0.

Figure 5:
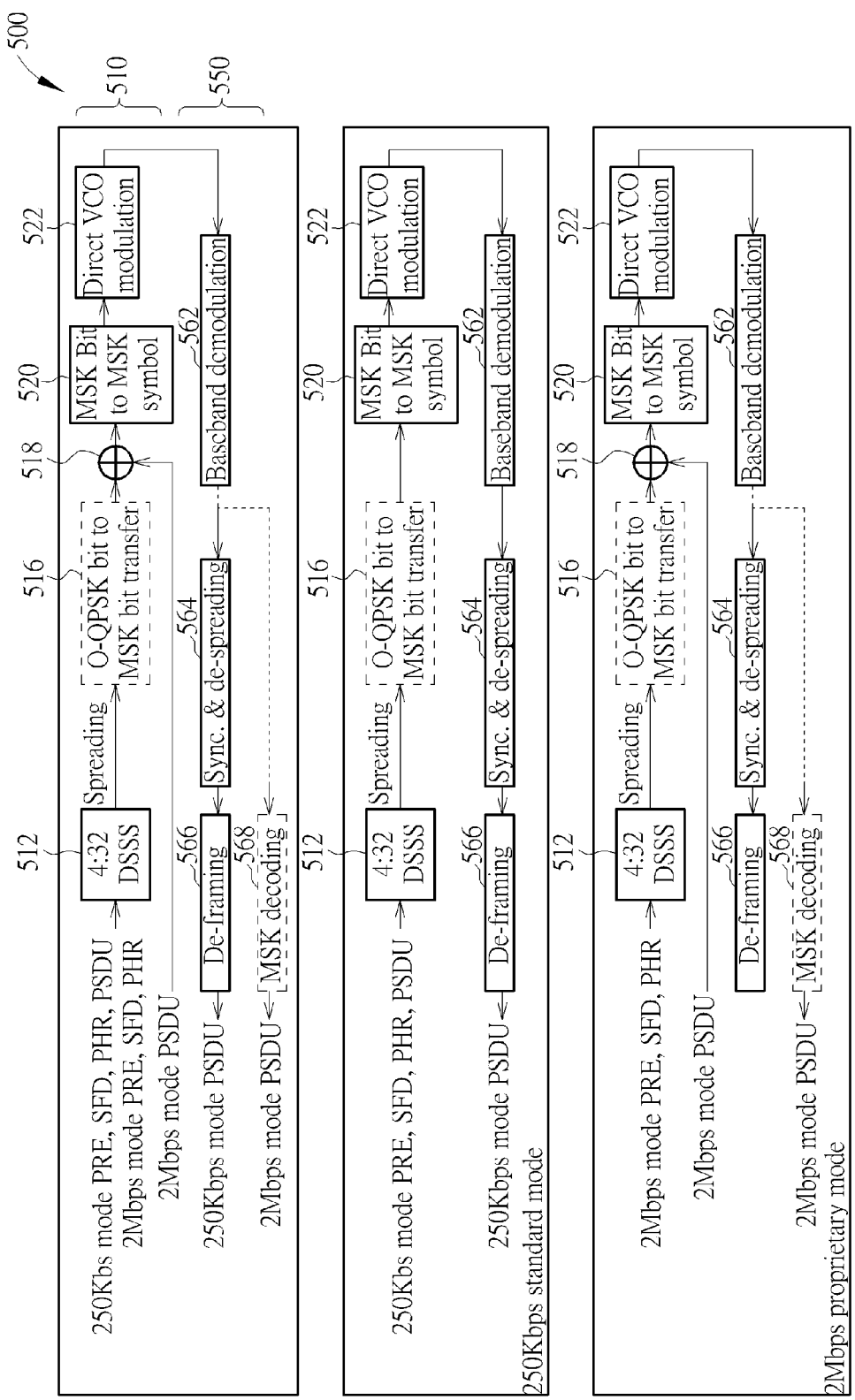
FIG. 5 is a functional block diagram of a proposed Offset-QPSK/MSK baseband system.

The overall baseband system flow of the proposed Offset-QPSK/MSK baseband system 500 is shown in FIG. 5. There are two additional functional blocks 516, 568, which are outlined by a dotted line for easy reference, when compared to a conventional DSSS Offset-QPSK system. The new block 516 in transmitter side is the Offset-QPSK to MSK translate module 516. The other new block 568 is arranged in the receiver side, and the function is MSK decoding. This MSK decoding is transferring the baseband demodulation output to bit information via inverse function of MSK encoding method.

The proposed Offset-QPSK/MSK baseband system 500 includes a transmitter 510, a receiver 550. The transmitter includes a DSSS module 512 to apply spreading codes to input data. The output of the DSSS module 512 is passing to the Offset-QPSK bit to MSK bit transfer module 516. Output of the Offset-QPSK bit to MSK bit transfer module 516 is combined with the MSK payload (2 Mbps mode PSDU) with the mixer 518. Output of the mixer 518 is sent to the Bit to MSK symbol module 520 and then modulated by the Direct VCO Modulation module 522.

Signal that is received by the receiver 550 and processed by baseband demodulation 562 then output bit-level stream. According to which transmission mode is detected, output of the baseband demodulation signal processing 562 transfers to the Sync & de-spreading module 564 and/or to the MSK decoding module 568. For example, when the standard mode is used, the entire received packet requires to be de-spread before De-Framing in the De-Framing module 566 so the entire received packet is sent to the Sync & de-spreading module 564 before the De-Framing module 566. When the proprietary mode is used, the preamble, the SFD, and the PHR of the received packet requires to be de-spread before De-Framing in the De-Framing module 566 so the preamble, the SFD, and the PHR of received packet is sent to the Sync & de-spreading module 564 before the De-Framing module 566, while the data payload (PHY) does not require de-spreading so is routed to the De-Framing module 566 via the MSK decoding module 568.

When the channel or noise do not affect the transmitted signal significantly or it is desired to send a high data rate stream without critical data, the proposed Offset-QPSK/MSK baseband system 500 can deliver a high data rate MSK modulation signal (without DSSS) on-the-fly with same spectrum requirement.

Figure 6:
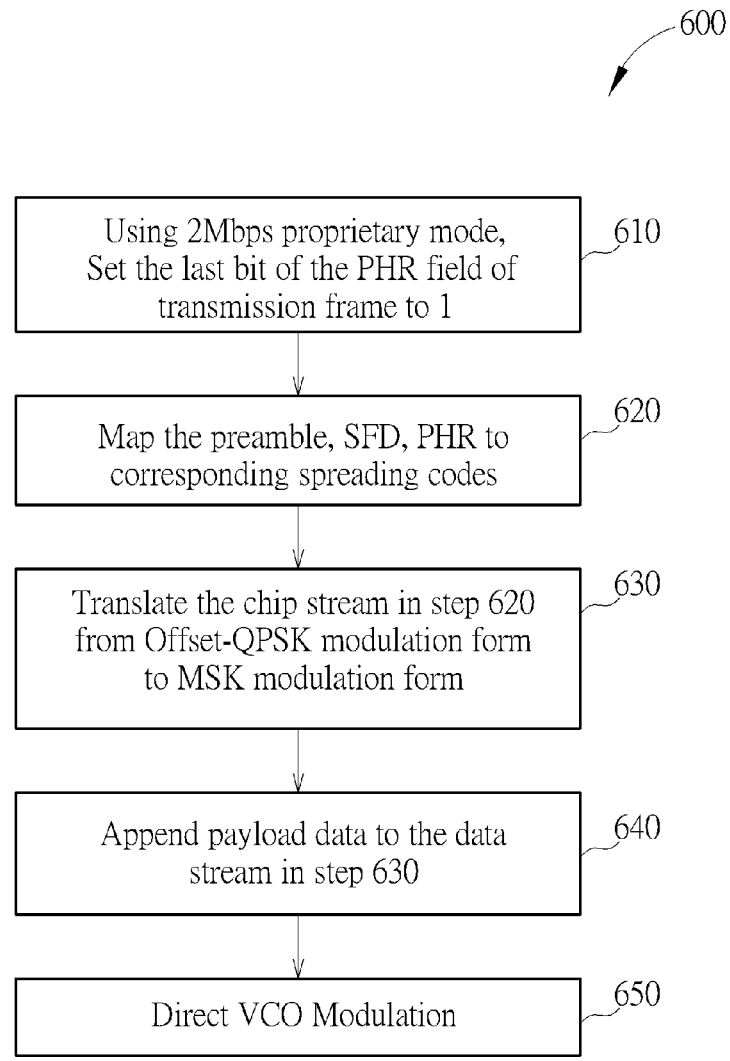
FIG. 6 is a procedure to create a 2 Mbps proprietary mode which uses MSK direct VCO modulation.

FIG. 6 is a procedure 600 to create the 2 Mbps proprietary mode which uses MSK direct VCO modulation.

Step 610: Using 2 Mbps proprietary mode, set the last bit of the PHR field of transmission frame to 1.

Step 620: Map the preamble, SFD and PHR to corresponding spreading codes.

Step 630: Translate the chip stream in Step 620 from Offset QPSK modulation form to MSK modulation form.

Step 640: Append payload data to the data stream in Step 630.

Step 650: Modulate the (MSK) data stream in Step 640 using Direct VCO modulation.

Please note the map from Offset-QPSK to MSK modulation shown in Step 630 is not a must. The proprietary 2 Mbps mode can also use Offset-QPSK modulation if desired. In this situation, a mapping from MSK to Offset-QPSK is required where the preamble, SFD and field byte does not need to map and only the data part does.

Figure 2A:
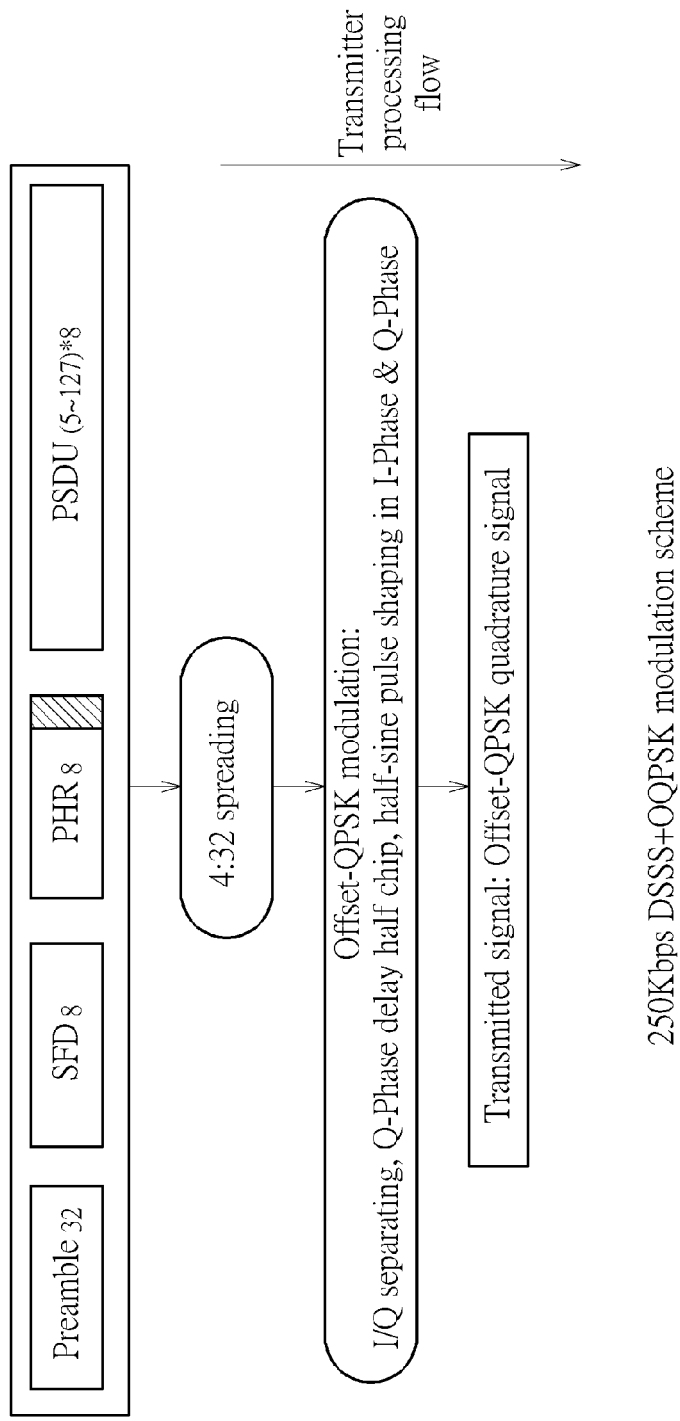
FIG. 2a-2c illustrate the signal processing flow of conventional DSSS O-QPSK modulation flow, DSSS O-QPSK signal using MSK modulation or MSK Direct VCO modulation, and proposed high data rate MSK modulation or MSK Direct VCO modulation in an existing DSSS O-QPSK system.
Figure 2B:
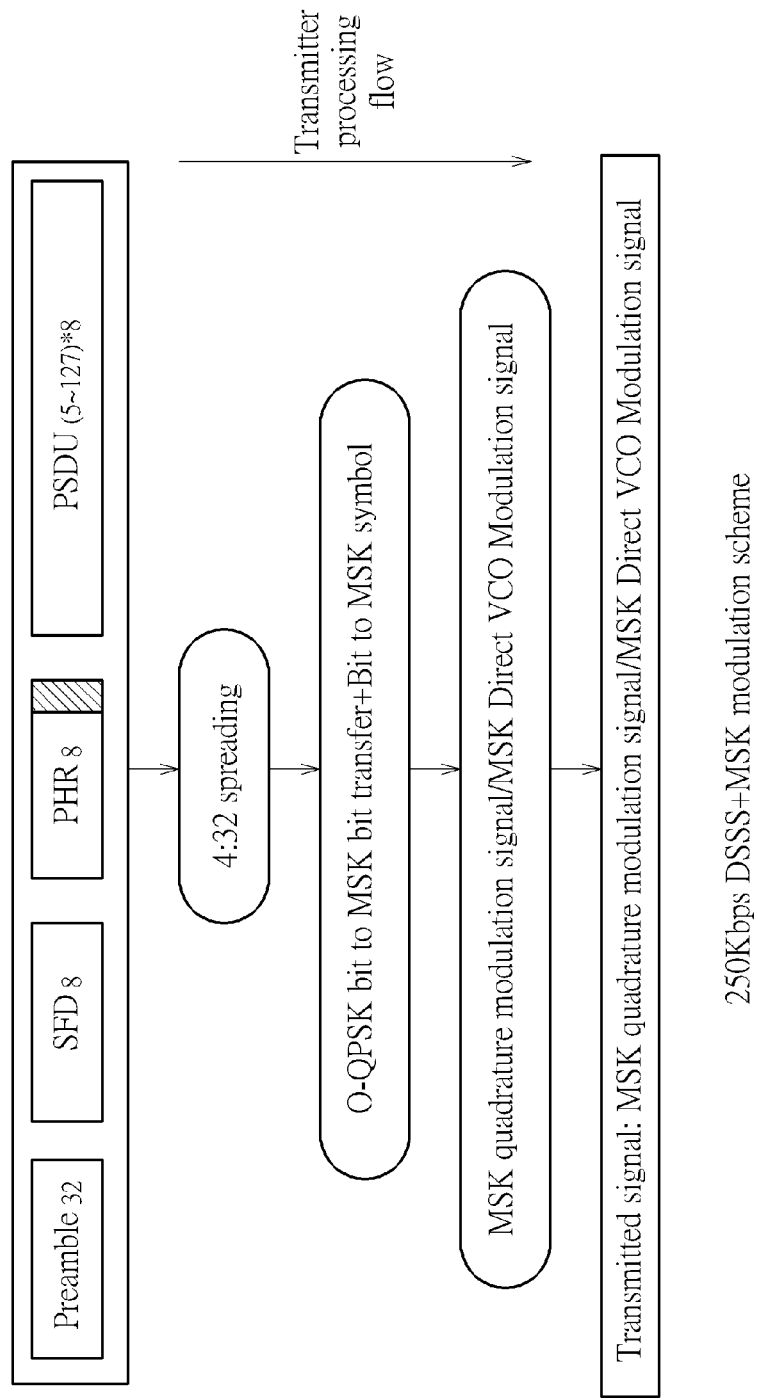

Referring now to FIG. 2a and FIG. 2b, when utilizing the standard encoding mode, the transmitter is configured to map a preamble, a delimiter (SFD), the frame length byte (PHR), and payload data (PSDU) to corresponding spreading codes to form a data stream. In FIG. 2a, when the transmitter modulate DSSS data stream in O-QPSK modulation, the data stream would be separated into I-Phase stream and Q-Phase steam, then O-Phase delay half-chip. After Q-Phase delay half-chip, I-Phase stream and Q-Phase stream passed to half-sine shape pulse shaping then combined to O-QPSK form quadrature signal.

In FIG. 2b, the transmitter may be further configured to map the data stream from Offset-QPSK modulation to MSK modulation to form the transmission frame and modulate the transmission frame according to MSK quadrature modulation, or according to MSK direct VCO modulation (either open or closed VCO modulation).

Figure 2C:
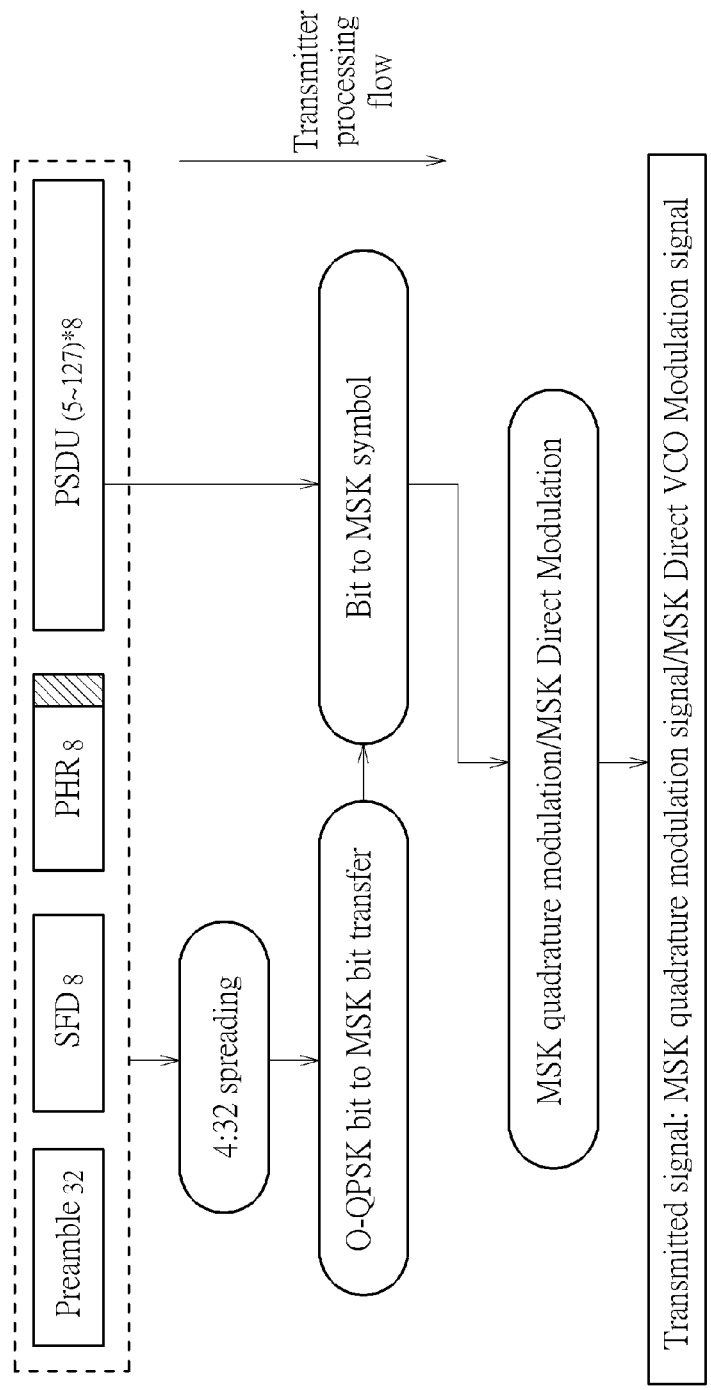

Referring now to FIG. 2c, when utilizing the proprietary encoding mode, the transmitter is configured to map a preamble, a delimiter (SFD), and the frame length byte (PHR), to corresponding spreading codes to form a data stream. Payload data (PSDU) is appended to the data stream to form an appended data stream without mapping the payload data to the corresponding spreading codes. The transmitter then may modulate the transmission frame according to MSK quadrature modulation, or according to MSK direct VCO modulation.

CONCLUSION

Applying the proposed design into an IEEE 802.15.4 DSSS Offset-QPSK system, an existing system can transfer Offset-QPSK modulation signal into MSK modulation signal, then deliver MSK modulation signal without DSSS. Thus an extra high data rate transmission for IEEE 802.15.4 DSSS Offset-QPSK systems can be provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An Institute of Electrical and Electronics Engineers 802.15.4 direct-sequence spread spectrum (DSSS) Offset-Quadrature Phase-shift keying (Offset-QPSK) device comprising:
    a transmitter configured to set a predetermined bit in a frame length byte of a transmission frame to indicate whether the transmission frame is encoded by a standard encoding mode or by a proprietary encoding mode different from the standard encoding mode; and
    a receiver configured to decode a received transmission frame according to whether the predetermined bit in the received transmission frame indicates the received transmission frame is encoded by the standard encoding mode or by the proprietary encoding mode.

2. The device of claim 1 wherein the transmitter is further configured to map an Offset-QPSK preamble, a delimiter (SFD), and the frame length byte to corresponding spreading codes to form a data stream.

3. The device of claim 2 wherein the transmitter is further configured to map Offset-QPSK payload data to the corresponding spreading codes to form mapped Offset-QPSK payload data and append the mapped Offset-QPSK payload data to the data stream to form an appended data stream when encoding by the standard encoding mode.

4. The device of claim 3 wherein the transmitter is further configured to map the appended data stream from Offset-QPSK modulation to MSK modulation to form the transmission frame according to:
    when a current chip is an I-Phase chip, if previous Q-Phase chip and the current I-Phase chip are a first same sign value, output will be phase rotated clockwise by 90 degrees and if the previous Q-Phase chip and the current I-Phase chip are not the first same sign value, output will be phase rotated counter-clockwise by 90 degrees; and
    when the current chip is a Q-Phase chip, if previous I-Phase chip and the current Q-Phase chip are a second same sign value, output will be phase rotated counter-clockwise by 90 degrees and if the previous I-Phase chip and the current Q-Phase chip are not the second same sign value, output will be phase rotated clockwise by 90 degrees.

5. The device of claim 4 wherein the transmitter is further configured to modulate the transmission frame according to MSK quadrature modulation.

6. The device of claim 4 wherein the transmitter is further configured to modulate the transmission frame according to MSK direct VCO modulation.

7. The device of claim 2 wherein the transmitter is further configured to append payload data to the data stream to form an appended data stream without mapping the payload data to the corresponding spreading codes when encoding by the proprietary encoding mode.

8. The device of claim 7 wherein the transmitter is further configured to modulate the transmission frame according to minimum-shift keying (MSK) modulation.

9. The device of claim 7 wherein the transmitter is further configured to map the appended data stream from Offset-QPSK modulation to MSK modulation to form the transmission frame according to:
    when a current chip is an I-Phase chip, if previous Q-Phase chip and the current I-Phase chip are a first same sign value, output will be phase rotated clockwise by 90 degrees and if the previous Q-Phase chip and the current I-Phase chip are not the first same sign value, output will be phase rotated counter-clockwise by 90 degrees; and
    when the current chip is a Q-Phase chip, if previous I-Phase chip and the current Q-Phase chip are a second same sign value, output will be phase rotated counter-clockwise by 90 degrees and if the previous I-Phase chip and the current Q-Phase chip are not the second same sign value, output will be phase rotated clockwise by 90 degrees.

10. The device of claim 9 wherein the transmitter is further configured to modulate the transmission frame according to MSK quadrature modulation.

11. The device of claim 9 wherein the transmitter is further configured to modulate the transmission frame according to MSK direct VCO modulation.

12. A method of operating an Institute of Electrical and Electronics Engineers 802.15.4 direct-sequence spread spectrum (DSSS) Offset-Quadrature Phase-shift keying (Offset-QPSK) device, the method comprising:
    setting a predetermined bit in a frame length byte of a transmission frame to indicate whether the transmission frame is encoded by a standard encoding mode or by a proprietary encoding mode different from the standard encoding mode; and
    decoding a received transmission frame according to whether the predetermined bit in the received transmission frame indicates the received transmission frame is encoded by the standard encoding mode or by the proprietary encoding mode.

13. The method of claim 12 wherein when the transmission frame is encoded by the standard encoding mode, the method further comprises:
    mapping an Offset-QPSK preamble, a delimiter (SFD), the frame length byte, and a payload data to corresponding spreading codes to form a data stream;
    mapping the data stream from Offset-QPSK modulation to minimum-shift keying (MSK) modulation to form the transmission frame; and
    transmitting the transmission frame.

14. The method of claim 12 wherein when the transmission frame is encoded by the proprietary encoding mode, the method further comprises:
    mapping an Offset-QPSK preamble, a delimiter (SFD), and the frame length byte to corresponding spreading codes to form a data stream;
    appending payload data to the data stream to form the transmission frame without mapping the payload data to the corresponding spreading codes;
    modulating the transmission frame according to minimum-shift keying (MSK) modulation; and
    transmitting the transmission frame.

* * * * *